Oct. 11, 1960     J. G. MACDONALD     2,955,580
PISTON ENGINE COMPRESSOR CONTROL

Filed June 20, 1957     2 Sheets-Sheet 1

INVENTOR
JOHN G. MACDONALD
ATTY

Oct. 11, 1960 J. G. MACDONALD 2,955,580
PISTON ENGINE COMPRESSOR CONTROL
Filed June 20, 1957 2 Sheets-Sheet 2

INVENTOR
JOHN G. MACDONALD
by Douglas S. Johnson
ATTY.

United States Patent Office 2,955,580
Patented Oct. 11, 1960

2,955,580

PISTON ENGINE COMPRESSOR CONTROL

John G. Macdonald, P.O. Box 476, Bayfield Road,
Goderich, Ontario, Canada

Filed June 20, 1957, Ser. No. 666,921

18 Claims. (Cl. 123—46)

This invention relates to improvements in internal combustion engines of the free piston type and the principal object of the invention is to provide an engine of this type which will operate efficiently over the full desired range of operation from no load or idle to full load operation and will not stall when idling.

Another and important object is to provide a free piston engine which can operate at lower speeds than present engines without operating in an erratic manner or stalling.

Another important object is to provide such free piston engine operation in an extremely simple and reliable engine construction in which the change in operating conditions according to load will be automatically effected.

In general in free piston engines the piston, or, more commonly where two opposed pistons are used, the pistons move outwardly on the combustion stroke to compress a charge of air in a bounce chamber. The energy stored in this compressed air then serves to return the piston inwardly after combustion is complete, and on the inward movement the piston is arranged to compress air in a compressor chamber, which compressed air is utilized to scavenge the combustion chamber. Usually the compressed air is delivered into an air box from where it is subsequently fed into the combustion chamber following the next combustion stroke to scavenge the exhaust gases.

The basic requirement of the engine is that sufficient air be compressed in the compressor to provide complete scavenging or the requisite scavenging pressure at full load with the result that at no load or idling conditions there is an excess of compressed or scavenging air. This condition is aggravated by the fact that volumetric efficiency of compressor increases as the speed of the piston decreases and as a result operation of the engine at a point away from full load operation results in decreased engine efficiency, erratic operation and ultimate stalling.

According to the present invention the compressor portion of the engine system is controlled to overcome the above difficulties so that the requisite compressor and scavenging air pressure is provided in keeping with the load requirements of the engine.

More particularly according to the preferred form of the invention the control of the compressor and scavenging air pressure is automatically achieved in response to the operation of a control or sensing device directly responsive to the scavenging air reservoir pressure.

Another important feature resides in heating the scavenging air under light load or idling conditions to increase the combustion efficiency and enable the engine to operate at lower than normal speeds.

In this latter connection it is a feature of the invention to recirculate the air between the compressor cylinder and the scavenging air storage reservoir or air box at light load or idle conditions to achieve such heating.

These and other objects and features of the invention will become apparent from the following detailed description taken in conjunction with the accompanying drawings, in which.

The problem of operating a free piston engine when the engine speed is reduced is encountered in all types of free piston engines, and it will be understood that the particular form of engines illustrated herein in diagrammatic form are by way of example only, and the invention is applicable to all conventional free piston engines.

Put briefly, the basic problem with conventional free piston engines operating under a reduced speed or light load is that they are supplied with too much air, that is, if the compressor is arranged to supply adequate scavenging air at high power output, particularly in view of the increased compressor efficiencies at low speed at idle an excess of scavenging air is supplied producing an excessive energy drag resulting in erratic engine operation and stalling. These problems are particularly outlined in United States Patent Number 2,435,232, dated February 3, 1948, to Willard A. Morain, and United States Patent Number 2,701,555, dated February 8, 1955, to Robert Huber.

Figure 1:
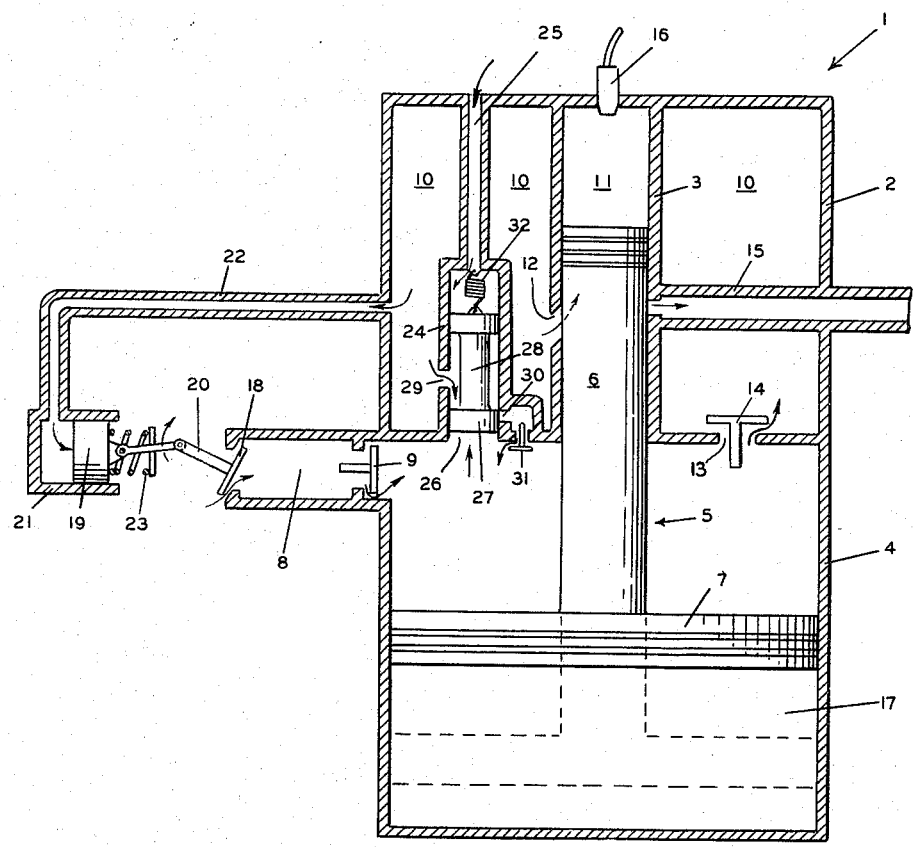
Figure 1 is a diagrammatical view showing in axial section a free piston engine embodying the invention.

With the foregoing in mind, reference is to be had to Figure 1, illustrating the application of the invention to an engine generally designated at 1 shown in its simplest diagrammatic form. The engine includes a casing 2 which is arranged to define a power or diesel cylinder 3 having at one end thereof an enlarged compressor cylinder 4. A piston, generally designated at 5, has a diesel portion 6 arranged to operate in the diesel cylinder 3 and a compressor portion 7 arranged to operate in the compressor cylinder 4. The compressor cylinder is provided with an intake passage 8 in which is arranged a one-way valve 9 to prevent escape of compressed air from the compressor cylinder.

The casing 2 also defines a scavenging air receiver 10 in scavenging connection with the combustion chamber 11 defined within the diesel cylinder 3 through port 12. The air receiver 10 is adapted to receive compressed air from the compressor cylinder 4 through port 13 controlled by one-way valve 14. An exhaust passage 15 leading from the combustion chamber 11 and arranged to be uncovered on downward movement of the piston 5 is arranged to conduct the hot gases of combustion from the combustion chamber to a turbine, not shown.

In the operation of an engine of this type, fuel injected into the combustion chamber 11 by a suitable fuel injector 16 is ignited under the compression of air in the combustion chamber, with the result that the piston 5 is driven outwardly, or rather, in the illustration, downwardly, to compress air in the portion 17 of the compressor cylinder below the piston portion 7, so that the air in this cylinder portion 17, commonly known as the bounce chamber, has energy stored therein to effect an inward, or rather, upward movement of the piston to complete the piston cycle.

As the system moves downwardly, it first uncovers the exhaust passage 15 to exhaust the hot gases to the turbine, and subsequently uncovers port 12, allowing air which has been previously compressed and stored in the air receiver 10 to be discharged to the combustion chamber 11 to effect scavenging thereof. The slant of the port 12 provides for essentially complete or loop scavenging.

Following exhaustion of the combustion chamber, the energy stored in the air in the bounce chamber serves to drive the piston upwardly on its inner or return stroke to compress the air in the combustion chamber 11 in preparation for the next combustion stroke, and at the same time, air is compressed in the compressor cylinder 4 and is forced through ports 13 into the air receiver 10 in preparation for the next scavenging operation.

In general, the operation of the engine so far described is well known in the art, and the particular form of engine may take a variety of actual structural arrangements.

According to the present invention, in addition to the intake valve 9, an additional valve 18, illustrated as of the butterfly type, is provided in the intake passage 8 leading to the compressor cylinder to control or regulate compressor cylinder intake. In the preferred embodiment of the invention, this butterfly valve 18 is arranged as a valve sensitive to air receiver pressure so that compressor cylinder intake is reduced under reduced air receiver pressure. It is understood in the art that the pressure in the air receiver 10 bears essentially a constant relation to the exhaust pressure, which of course, is proportional to the load imposed on the engine, for instance, by the turbine.

Thus, by making the butterfly valve 18 responsive or sensitive to air receiver pressure, it is made also responsive to exhaust pressures and hence load imposed. To achieve the control of the valve 18 from the air receiver pressure, the valve is connected to a piston element 19 by means of suitable linkage 20, the piston element 19 operating in a cylindrical sleeve or cylinder 21 which is open to the atmosphere on one side of the piston element 19, and is placed in communication with the air receiver 10 at the opposite side of the piston 19 by conduit 22. The operation is such that under high air receiver pressures, the piston 19 is forced outwardly against the action of spring 23 to open valve 18 allowing unrestricted intake flow into the compressor cylinder and vice versa.

The casing 2 also defines a cylindrical chamber 24 open at one end to the atmosphere through passage 25 and open at the opposite end to the compressor cylinder 4 through port or opening 26. Reciprocally received within the cylindrical chamber 24 is a piston 27 of spool configuration having a reduced waist portion 28. The chamber 24 has a port 29 placing the interior of the chamber 24 in communication with the interior of the air receiver 10 and it is also provided with port 30 arranged to place the interior of the chamber 24 in communication with the interior of the compressor cylinder through one-way valve 31, upon the piston 27 moving downwardly.

At full load operation, the piston 27 on the combustion stroke of the piston 5 is subjected at its upper end to atmospheric pressure and the pull of a spring 32, and at its lower end with valve 18 fully open to substantially atmospheric pressure within the compressor cylinder. The piston thus remains in the position illustrated covering port 30 and sealing the air receiver from communication with the compressor cylinder. Upon a decrease of air receiver pressure allowing the inward forces on piston 19 to move it inwardly and swing valve 18 towards the closed position, the intake air supply will be restricted, and as the piston 5 moves outwardly or downwardly on the combustion stroke, a vacuum condition will be set up in the compressor cylinder, that is, the compressor cylinder air pressure will drop below atmospheric.

Under these conditions, the atmospheric pressure acting on the upper side of the piston 27 will force the piston downwardly to uncover port 30 allowing air from the air receiver 10 to discharge into the air compressor cylinder 4, where on the upward or return stroke, it will be recompressed and delivered into the air receiver. This recirculation of the air between the air receiver and compressor cylinder and its recompression effect heating of the scavenging air with the result that the fuel in the combustion chamber can be ignited as the previously heated scavenging air is compressed on the inward piston stroke at lower compression ratios, thereby extending the range of operation of the engine. Additionally, of course, the reduction of the intake air to the compressor cylinder will reduce the air supply for scavenging, and in the arrangement shown will effect such reduction in proportion to the load to provide efficient engine operation throughout the load range.

While in the preferred embodiment of the invention the valve 18 is automatically controlled directly from the air receiver pressure, it will be understood that other forms of control, even manual control, may be resorted to in order to achieve a vacuum condition in the compressor cylinder under light load or starting conditions to thereby effect circulation and recompression of the receiver air for optimum engine operation.

Figure 2:
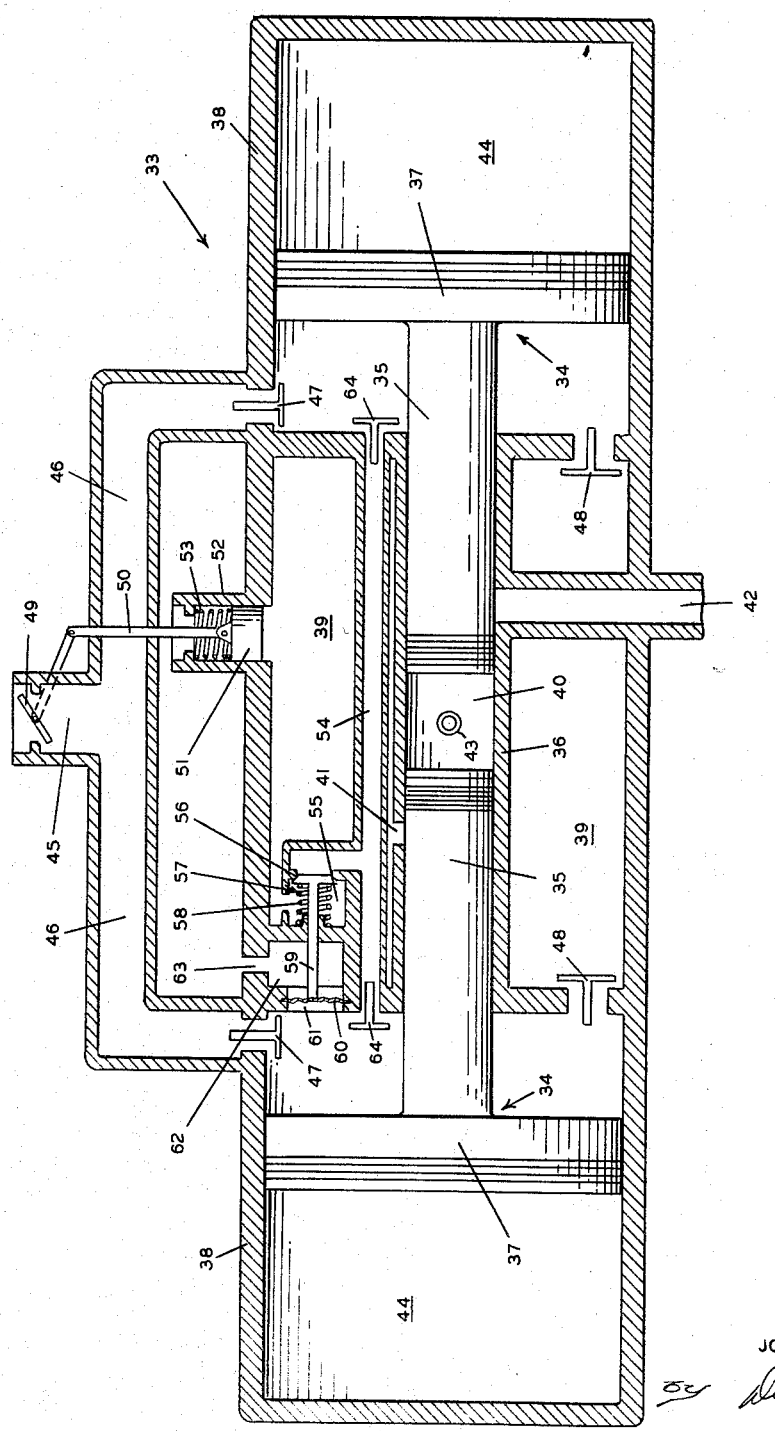
Figure 2 is a view similar to Figure 1 of an alternative form of engine having a pair of opposed pistons in place of the single piston shown in Figure 1.

Figure 2 shows the application of the invention to a free piston engine 33 having opposed pistons 34 provided with diesel portions 35 operating in diesel cylinder 36 and having compressor portions 37 operating in compressor cylinders 38 disposed at opposite ends of the diesel cylinder. Again, the engine is provided with an air receiver 39 in scavenging connection with the combustion chamber 40 defined within the diesel cylinder 36 through an inlet 41 and the combustion cylinder is arranged to be exhausted through exhaust passage 42, the exhaust passage and scavenging inlet being arranged to be opened on the outward combustion stroke of the pistons 34 upon combustion of fuel in the combustion chamber, the fuel being introduced into the chamber through a suitable fuel injector 43.

As in the usual engine arrangement, the compressor portions 37 of the pistons are arranged to compress air in bounce chambers 44 defined at the ends of the compressor cylinders 38, and the energy stored in this air is available to return the pistons inwardly on the compression stroke following exhaust and scavenging. During the outward combustion stroke, air is drawn inwardly into the compressor cylinders through, in this case, common intake passage 45 and branch passages 46 through intake valves 47. On the return or compression stroke of the pistons the valves 47 prevent escape of air in the compressor cylinders to the atmosphere, and this air is compressed and delivered under pressure through inlet valve 48 to the air receiver 39. Other than having the common intake passage 45, the arrangement of parts and the engine operation so far described with reference to Figure 2 may be found in conventional engines.

In accordance with the invention, in addition to the intake valve 47 compressor cylinder intake on the combustion stroke is controlled by a flow control valve 49 which may preferably be of the butterfly type, and preferably in accordance with the invention, the valve 49 is actuated through linkage 50 by means of a piston 51 operating in a cylindrical passage 52 opening to the interior of the air receiver 39. The arrangement is such that under normal air receiver pressure with engine loading, the piston 51 is urged upwardly against the pressure of spring 53 to open butterfly valve 49 to full open position, allowing unrestricted air flow to the compressor cylinders on the combustion stroke.

However, upon the engine being faced with a light load or under starting or idling conditions, when the exhaust pressure and hence air receiver pressure, drop to a low value, the action of the spring 53 is to force piston 51 inwardly to actuate valve 49 towards the closed position, thus restricting air flow to the compressor cylinders on the outward or combustion stroke of the pistons. Under this condition, as the pistons move outwardly, a sub-atmospheric pressure or vacuum condition will be set up within the compressor cylinders 38, and according to the present invention, under these circumstances, provision is made for discharging air from the receiver 39 into the compressor cylinders for recompression or recirculation and consequent heating, thereby counteracting the adverse effects of excess air under light load or starting conditions, and enabling, through the heating of the scavenging air, operation or combustion of the engine at reduced pressure ratios.

To achieve this circulation and recompression of the scavenging air under vacuum conditions, there is provided, leading from the air receiver 39 to the compressor cylinders, a passage formation 54 which includes a valving chamber 55 and a valve heat 56. A valve 57 is urged to seat on valve seat 56 by means of a spring 58 to normally maintain the passage formation 54 closed and prevent discharge from the air receiver to the compressor cylinders. The valve 57 is provided with a stem 59 which extends through one wall of the valving chamber 55, and is connected to a diaphragm 60 stretched across an opening 61 in the inner end of the left hand compressor cylinder 38. The left hand face of the diaphragm 60 is therefore subjected to the pressures existing in the compressor cylinder 38, while the opposite face of the diaphragm is subjected to pressures existing in chamber 62 which is in communication through passage 63 with the atmosphere.

Thus, under full load operation with unrestricted intake flow, the diaphragm 60 will have a balanced pressure equal to atmospheric pressure on opposite faces during the combustion stroke of the pistons. On the inner compression stroke, the diaphragm 60 will, of course, be forced in a direction to maintain the valve 57 on its seat 56 and the passage from the receiver through the passage 54 will remain closed. One-way valves 64 are provided to prevent compressor cylinder pressure from being applied in a direction to open valve 57.

Upon closing off of the butterfly valve 49 to create the vacuum condition in the compressor cylinder, however, the diaphragm will have atmospheric pressure applied on the right-hand side through chamber 62, and sub-atmospheric pressure applied on the left-hand side exposed to the interior of the compressor cylinder. The result is that the diaphragm will move to the left in a direction to lift valve 57 off its valve seat 56 against the action of spring 58, and pressure air in the air receiver 39 will be discharged into the two compressor cylinders to be recompressed on the next inward or compression stroke of the pistons, and to then again be delivered inwardly to the air receiver through valves 48.

It will be understood that the particular details of the parts and their arrangements may be varied in a great number of ways in the application of the invention, as will be apparent to those skilled in the art. Such changes and alterations may, of course, be made without departing from the spirit of the invention or scope of the appended claims.

What I claim as my invention is:

1. In a free piston engine, a diesel cylinder, a compressor cylinder, a piston having a diesel portion disposed to operate in said diesel cylinder and a compressor portion disposed to operate in said compressor cylinder, an inlet to said compressor cylinder, a scavenging air receiver to receive discharge from the latter cylinder, means for controlling air flow through said compressor inlet, and means responsive to a vacuum condition in said compressor cylinder to discharge air from said air receiver into said compressor cylinder.

2. In free piston internal combustion engines, a diesel cylinder and a compressor cylinder, a piston having a diesel portion disposed to operate in said diesel cylinder and a compressor portion disposed to operate in said compressor cylinder, said compressor cylinder having an inlet thereto to admit air on the combustion stroke of said piston, a scavenging air receiver to receive air from said compressor cylinder on the compression stroke of the piston, means for reducing air intake through said compressor cylinder inlet under reduced engine loads, and means responsive to a vacuum condition in said compressor under reduced air intake to discharge air from said air receiver into said compressor cylinder.

3. In a free piston internal combustion engine, a diesel cylinder and a compressor cylinder, a piston having a diesel portion disposed to operate in said diesel cylinder and a compressor portion disposed to operate in said compressor cylinder, said compressor cylinder having an inlet thereto to admit air on the combustion stroke of said piston, a scavenging air receiver to receive air from said compressor cylinder on the compression stroke of the piston, means responsive to pressure in said air receiver for controlling air intake through said compressor cylinder inlet and arranged to reduce air intake on decrease of receiver pressure, and means responsive to a vacuum condition in said compressor cylinder to return air from said air receiver into said compressor cylinder.

4. In a free piston engine, a diesel cylinder, a compressor cylinder, a piston having a diesel portion, disposed to operate in said diesel cylinder, and a compressor portion disposed to operate in said compressor cylinder, said compressor cylinder having an air intake to admit air on the combustion stroke of the piston, a scavenging air receiver having an inlet to receive scavenging air on the compression stroke of the piston, means to control said compressor cylinder intake to reduce compression intake under light engine loading, a valve controlled return passage from said air receiver to said compressor cylinder, and means responsive to abnormally low pressure in said compressor cylinder on the combustion stroke of the piston to open said valve controlled return passage during the combustion stroke to effect circulation and consequent heating of scavenging air between the compressor cylinder and air receiver.

5. A device as claimed in claim 4 in which the means to control said compressor cylinder intake comprises a valve, and means responsive to air receiver pressure to control said latter valve to decrease compressor air intake under decreasing air receiver pressure.

6. A device as claimed in claim 5 in which said means responsive to receiver air pressure controlling said intake valve comprises a piston member snugly slidable in a passage opening to said air receiver at one end and to the atmosphere at the other end, a linkage connecting said latter piston member and said intake valve.

7. A device as claimed in claim 6 in which said compressor intake flow control valve is responsive to air receiver pressure to restrict air intake into said compressor cylinder under reduced air receiver pressure.

8. In a free piston internal combustion engine a diesel cylinder defining a combustion chamber and having at least at one end thereof an enlarged compressor cylinder, and a bounce chamber, at least one piston having a diesel piston portion disposed to operate in said diesel cylinder and a compressor piston portion disposed to operate in said compressor cylinder, said compressor cylinder having an air intake, said piston being adapted on combustion in said combustion chamber to move outwardly to compress air in said bounce chamber and to draw air into said compressor cylinder through said air intake, and on exhaustion of said combustion chamber to move inwardly under the effect of the compressed air stored in said bounce chamber to compress air in said compressor cylinder, a scavenging air receiver in scavenging connection with said combustion chamber to receive air compressed in said compressor cylinder, a first inlet valve in said compressor cylinder intake to prevent compressed air escape, a second flow control valve for regulating amount of air intake on outward piston movement, a return passage from said air receiver to said compressor cylinder, and a valve normally closing said return passage and responsive to a vacuum condition in said compressor cylinder under restricted intake flow to open said return passage and allow discharge of receiver air back into said compressor cylinder thereby circulating and heating scavenging air.

9. A device as claimed in claim 8 in which a piston member is reciprocally mounted in a cylinder in communication with said air receiver to move in one direction under the influence of receiver air pressure, and bias means are provided acting on said piston member in opposition to receiver air pressure, and means connecting said latter piston member and said compressor intake flow control valve to actuate said latter valve in a direction to reduce compressor intake flow under reduced receiver air pressure and vice versa.

10. A device as claimed in claim 8 in which said return passage valve comprises a valving piston member operating in a guide cylinder open at one side of said latter piston to said compressor cylinder and open at the opposite side of said latter piston to the atmosphere, and said return passage comprises port means in said guide cylinder providing communication between said air receiver and said compressor cylinder, bias means biasing said latter piston to close said port means under unrestricted intake flow to said compressor cylinder, said latter piston member being responsive to vacuum conditions in said compressor cylinder under restricted compressor cylinder air intake to uncover said port means to discharge receiver air into said compressor cylinder.

11. A device as claimed in claim 8 in which said return passage valve comprises a valve member connected to a diaphragm exposed on one side to the interior of said compressor cylinder and on the other to the atmosphere, the arrangement being such that under compressor cylinder pressures at least equal to atmospheric pressure said latter valve member maintains said return passage closed, and under compressor cylinder pressure less than atmosphere pressure, said latter valve member is actuated to open said return passage.

12. A device as claimed in claim 8 in which bias means are provided urging said latter valve to return passage closing position.

13. A device as claimed in claim 8 in which said diesel cylinder has a compressor cylinder and a bounce chamber at each end thereof, and a pair of opposed pistons provided with diesel portions disposed to operate in said diesel cylinder and with compressor portions disposed to operate in said compressor cyilnders, and the intake of each of said compressor cylinders is connected to a common intake passage and said flow control valve is disposed in said common intake passage.

14. A device as claimed in claim 13 in which control means are provided for said flow control valve, said control means being responsive to air receiver pressure.

15. A device as claimed in claim 13 in which said return passage from said air receiver comprises a common return passage opening into both of said compressor cylinders through one way compressor cylinder inlet valves, said return passage having a valve seat formed therein, and said valve responsive to compressor cylinder vacuum conditions comprises a valve normally seated on said valve seat, and pressure responsive control means for said latter valve exposed to the internal pressure in one of said compressor cylinders.

16. A device as claimed in claim 15 in which said pressure responsive control means comprises a diaphragm arranged in a diaphragm chamber communicating at one side of the diaphragm with the interior of one of said compressor cylinders and at the other side of the diaphragm with the atmosphere, a member connected between said diaphragm and said latter valve, the arrangement being such that on sub-atmospheric pressures in said latter compressor cylinder said diaphragm is adapted to be actuated in a direction to withdraw said latter valve from said valve seat, means isolating said diaphragm chamber from said return passage and said air receiver, and bias means biasing said valve in a direction to seat on said valve seat.

17. In a free piston internal combustion engine having a combustion chamber, a scavenging air receiver to store scavenging air for scavenging said combustion chamber and a compressor chamber in which air is adapted to be compressed and delivered to said air receiver, said compressor chamber having an air intake, free piston means disposed to operate in said chambers, means responsive to a vacuum condition in said compressor chamber for effecting circulation of scavenging air between said air receiver and compressor chamber to effect heating of the scavenging air and means to restrict air intake to provide a vacuum condition in said compressor chamber under light engine loading.

18. In a free piston engine, a power cylinder and at least one compressor cylinder, a piston in said power cylinder with a compressor piston portion in said compressor cylinder adapted on reciprocation to compress air during one portion of its stroke and to create a suction in the compressor cylinder during another portion of its stroke, a scavenging air receiver, an air inlet into said compressor cylinder and an outlet from said compressor cylinder into said scavenging air receiver, a return air passage between said scavenging air receiver and said compressor cylinder, a valve in said return air passage to release previously compressed air from said air receiver back into said compressor cylinder on the suction portion of the stroke of said compressor piston, an air throttling valve in said inlet of said compressor cylinder and means to adjust said air throttling valve towards the closed position at low engine output to cause said valve in said return air passage to release air in increasing quantities from said scavenging air receiver into said compressor cylinder on the suction portion of the stroke of the compressor piston as said throttling valve is moved towards the closed position.

References Cited in the file of this patent

UNITED STATES PATENTS

| | | |
|---|---|---|
| 2,086,162 | Janicke | July 6, 1937 |
| 2,435,232 | Morain | Feb. 3, 1948 |
| 2,462,745 | Horgan | Feb. 22, 1949 |
| 2,470,231 | Beale | May 17, 1949 |
| 2,678,032 | Mallory | May 11, 1954 |